(12) United States Patent
Feng et al.

(10) Patent No.: US 12,492,888 B2
(45) Date of Patent: Dec. 9, 2025

(54) FIXTURE FOR TESTING BENDING SHIFTING OF FLEXIBLE DISPLAY MODULE AND TEST METHOD THEREOF

(71) Applicants: Chengdu BOE Optoelectronics Technology Co., Ltd., Sichuan (CN); BOE Technology Group Co., Ltd., Beijing (CN)

(72) Inventors: Binfeng Feng, Beijing (CN); Zhicai Xu, Beijing (CN); Fei Li, Beijing (CN); Zhihao Xie, Beijing (CN); Jiaxiang Wang, Beijing (CN); Ying Zhang, Beijing (CN); Bowen Xiao, Beijing (CN); Chang Liu, Beijing (CN); Xuan Tao, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/915,499

(22) PCT Filed: Nov. 16, 2021

(86) PCT No.: PCT/CN2021/130902
§ 371 (c)(1),
(2) Date: Sep. 29, 2022

(87) PCT Pub. No.: WO2022/227503
PCT Pub. Date: Nov. 3, 2022

(65) Prior Publication Data
US 2024/0240932 A1    Jul. 18, 2024

(30) Foreign Application Priority Data
Apr. 28, 2021    (CN) .......................... 202110470414.0

(51) Int. Cl.
*G01B 11/02* (2006.01)
(52) U.S. Cl.
CPC .................................... *G01B 11/02* (2013.01)
(58) Field of Classification Search
CPC ......... G01B 11/02; G01B 21/02; G09F 9/301; G01M 99/007; G01N 3/20
(Continued)

(56) References Cited

U.S. PATENT DOCUMENTS

2018/0240439 A1    8/2018   Zeng et al.
2019/0339742 A1    11/2019  Jia

FOREIGN PATENT DOCUMENTS

CN    103604402 A    2/2014
CN    109490117 A    3/2019
(Continued)

OTHER PUBLICATIONS

International Search Report for PCT/CN2021/130902 Mailed Feb. 23, 2022.
(Continued)

*Primary Examiner* — Sunghee Y Gray
(74) *Attorney, Agent, or Firm* — Ling Wu; Stephen Yang; Ling and Yang Intellectual Property

(57) ABSTRACT

A fixture for testing bending shifting of a flexible display module and a test method thereof are provided. The flexible display module includes a bending region and a first non-bending region and a second non-bending region located at two sides of the bending region, the flexible display module is bent through the bending region, and the first non-bending region or the second non-bending region has an under-screen opening; the fixture includes a first support plate and a second support plate rotatably connected, the first support plate is configured to be fixedly connected with the first non-bending region, and the second support plate is config-
(Continued)

ured to be fixedly connected with the second non-bending region; the first support plate or the second support plate has a transparent region, and the transparent region is disposed for observation of shifting at the under-screen opening of the flexible display module in a bent state.

15 Claims, 4 Drawing Sheets

(58) Field of Classification Search
 USPC .......................................................... 356/450
 See application file for complete search history.

(56) References Cited

FOREIGN PATENT DOCUMENTS

| CN | 109922181 A | 6/2019 | | |
|---|---|---|---|---|
| CN | 110286043 A | 9/2019 | | |
| CN | 110749511 A | 2/2020 | | |
| CN | 110763548 A | 2/2020 | | |
| CN | 110895190 A | 3/2020 | | |
| CN | 210984090 U | 7/2020 | | |
| CN | 111638044 A | 9/2020 | | |
| CN | 111724678 A | 9/2020 | | |
| CN | 111739417 A | 10/2020 | | |
| CN | 111862824 A | 10/2020 | | |
| CN | 111912609 A | 11/2020 | | |
| CN | 111981275 A | 11/2020 | | |
| CN | 212059727 U | 12/2020 | | |
| CN | 212159397 U | 12/2020 | | |
| CN | 112345381 A | 2/2021 | | |
| CN | 112447112 A | 3/2021 | | |
| CN | 113188451 A | 7/2021 | | |
| KR | 20140026663 A | * | 3/2014 | .............. G01N 3/08 |
| KR | 10-1762141 B1 | 7/2017 | | |
| KR | 102053319 B1 | * | 12/2019 | |

OTHER PUBLICATIONS

Office Action dated Sep. 15, 2022 for Chinese Patent Application No. 202110470414.0 and English Translation.
Decision to Grant dated Jan. 20, 2023 for Chinese Patent Application No. 202110470414.0 and English Translation.

* cited by examiner

FIXTURE FOR TESTING BENDING SHIFTING OF FLEXIBLE DISPLAY MODULE AND TEST METHOD THEREOF

CROSS-REFERENCE TO RELATED APPLICATIONS

The present application is a U.S. National Phase Entry of International Application PCT/CN2021/130902 having an international filing date of Nov. 16, 2021, which claims priority of Chinese patent application No. 202110470414.0, filed to the CNIPA on Apr. 28, 2021 and entitled "Fixture for Testing Bending Shifting of Flexible Display Module and Test Method Thereof", and the contents disclosed in the above-mentioned application are hereby incorporated as a part of this application.

TECHNICAL FIELD

Embodiments of the present disclosure relates to but is not limited to the field of display technology, in particular to a fixture for testing bending shifting of a flexible display module and a test method thereof.

BACKGROUND

Organic light-emitting diode (OLED) flexible displays have been applied to foldable display devices because of foldable characteristics thereof. With development of foldable products, a bending radius of OLED flexible display module is getting smaller, while its thickness is getting smaller. When the foldable display device is folded, the flexible display module is bent. In the bending process, due to different bending radii of multiple film materials of the flexible display module, a phenomenon of shifting will occur among the film materials, and a magnitude of shifting generated between the film materials will affect the display quality of the foldable display device. Therefore, it is necessary to test shifting produced during bending of the flexible display module to obtain the value of the shifting. In some technologies, the value of the shifting obtained based on CAE simulation model is quite different from a real feedback value. At present, there is no relevant device and test method that can accurately, intuitively test the value of the shifting with a low cost.

SUMMARY

The following is a summary of subject matter described herein in detail. The summary is not intended to limit the protection scope of claims.

An embodiment of the present disclosure provides a fixture for testing bending shifting of a flexible display module. The flexible display module includes a bending region and a first non-bending region and a second non-bending region located at two sides of the bending region, wherein the flexible display module is bent through the bending region, and the first non-bending region or the second non-bending region is provided with an under-screen opening; the fixture includes a first support plate and a second support plate which are rotatably connected, wherein the first support plate is configured to be fixedly connected with the first non-bending region, and the second support plate is configured to be fixedly connected with the second non-bending region; the first support plate or the second support plate is provided with a transparent region, and the transparent region is disposed for observation of shifting at the under-screen opening of the flexible display module in a bent state.

An embodiment of the present disclosure further provides a method for testing bending shifting of a flexible display module using a fixture. The flexible display module includes a bending region, a first non-bending region and a second non-bending region located at two sides of the bending region, the flexible display module is bent through the bending region, a length direction of the bending region is taken as a first direction, and the fixture includes a first support plate and a second support plate which are rotatably connected, and the method includes:

fixedly connecting the first non-bending region and the second non-bending region of the flexible display module to a first surface of the first support plate and a second surface of the second support plate, and making two side edges of the flexible display module parallel to the first direction protrude from corresponding side edges of the first support plate and the second support plate respectively;

rotating one of the first support plate and the second support plate relative to the other by an preset angle, such that the flexible display module can be bent along the bending region; and an observing shifting at two side edges of the flexible display module parallel to the first direction using a test instrument when the flexible display module is in a bent state.

Other aspects may be understood upon reading and understanding the drawings and the detailed description.

BRIEF DESCRIPTION OF DRAWINGS

Accompanying drawings are intended to provide a further understanding of technical solutions of the present disclosure and form a part of the specification, and are used to explain the technical solutions of the present disclosure together with embodiments of the present disclosure, and not intended to form limitations on the technical solutions of the present disclosure. Shapes and sizes of various components in the drawings do not reflect actual scales, and are only intended to schematically illustrate the contents of the present disclosure.

DETAILED DESCRIPTION

Those of ordinary skills in the art should understand that modifications or equivalent replacements may be made to the technical solutions of the embodiments of the present disclosure without departing from the spirit and scope of the technical solutions of the embodiments of the present disclosure, and should all fall within the scope of the claims of the present disclosure.

Figure 1:
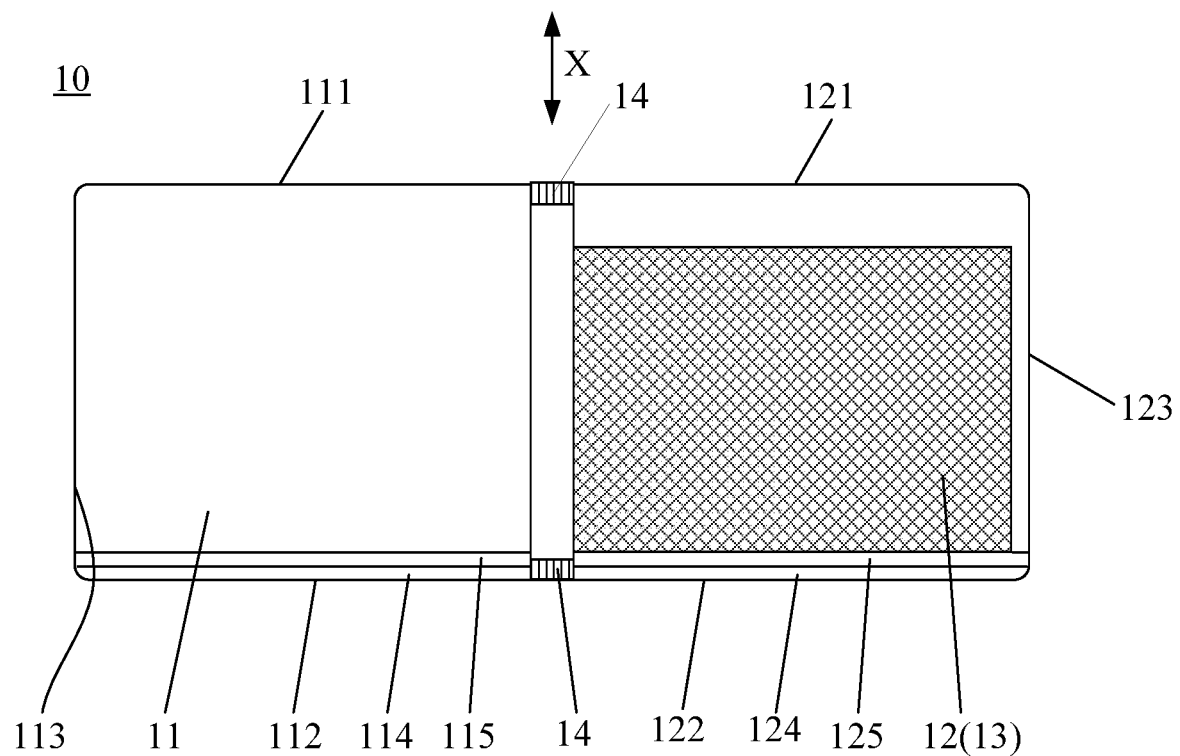
FIG. 1 is a schematic structural diagram of a fixture for testing bending shifting of a flexible display module in a deployed state according to some exemplary embodiments.
Figure 3:
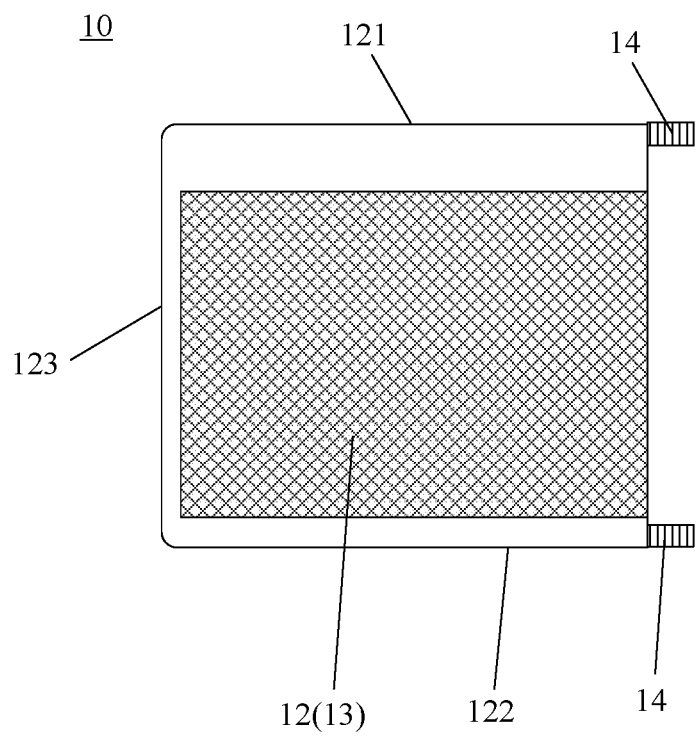
FIG. 3 is a schematic structural diagram of the fixture of FIG. 1 in a folded state.
Figure 4:
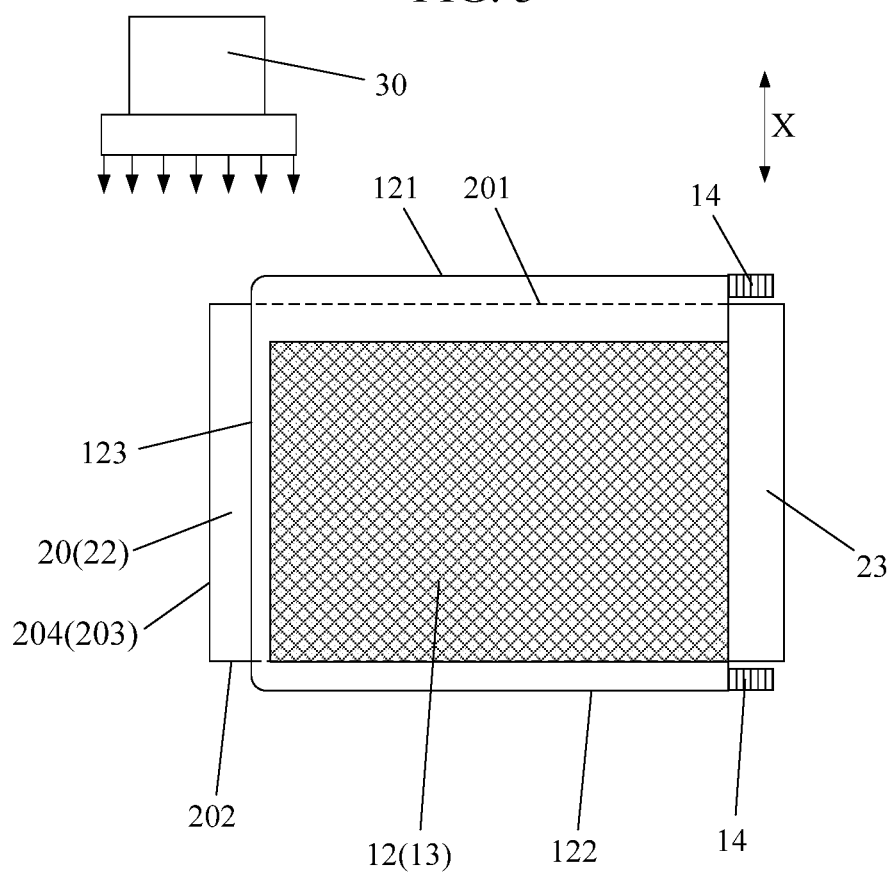
FIG. 4 is a schematic structural diagram of the flexible display module and the fixture when the flexible display module is bent to a folded state during testing the bending shifting of the flexible display module using the fixture of FIG. 1.
Figure 5:
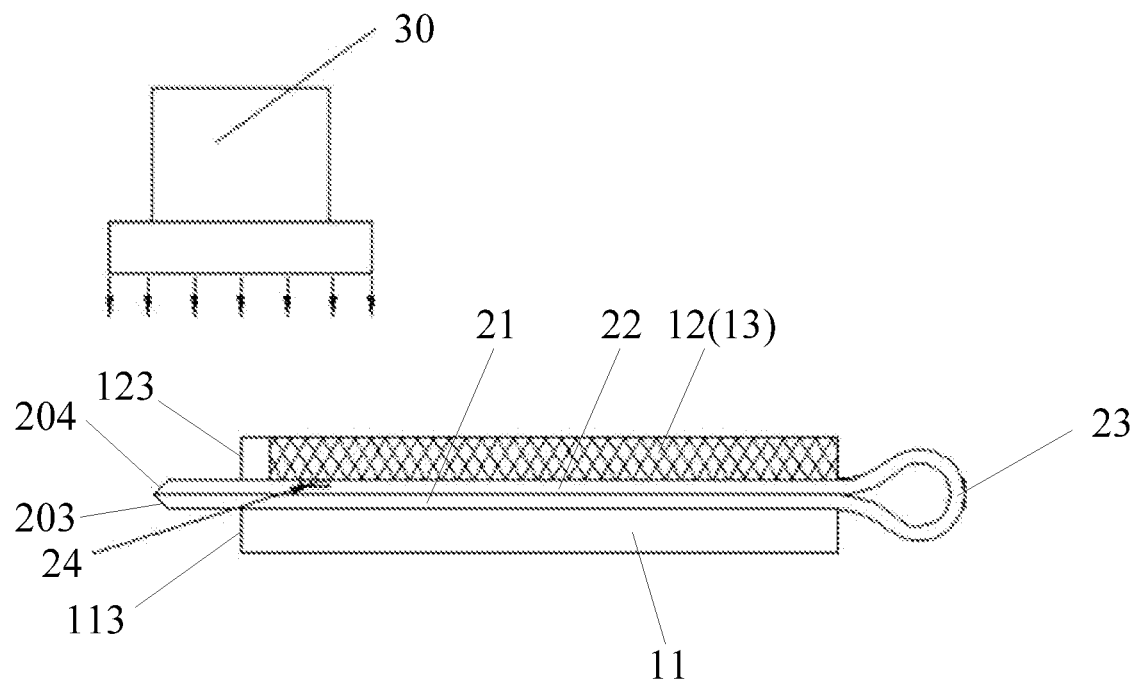
FIG. 5 is a schematic structural diagram of the flexible display module and the fixture from another perspective when the flexible display module is bent to a folded state during testing the bending shifting of the flexible display module using the fixture of FIG. 1.

An embodiment of the present disclosure provides a fixture for testing bending shifting of a flexible display module, as shown in FIG. 1, FIG. 3, FIG. 4 and FIG. 5. FIG. 1 is a schematic structural diagram of a fixture for testing bending shifting of a flexible display module in a deployed state according to some exemplary embodiments, FIG. 3 is a schematic structural diagram of the fixture of FIG. 1 in a folded state, and FIG. 4 and FIG. 5 are schematic structural diagrams of the flexible display module and the fixture from different perspectives when the flexible display module is bent to the folded state during testing the bending shifting of the flexible display module using the fixture of FIG. 1. As shown in FIG. 5, the flexible display module includes a bending region 23 and a first non-bending region 21 and a second non-bending region 22 located at two sides of the bending region 23. The flexible display module 20 is bent through the bending region 23, and the first non-bending region 21 or the second non-bending region 22 is provided with an under-screen opening 24. As shown in FIG. 1 and FIG. 5, the fixture 10 includes a first support plate 11 and a second support plate 12 which are rotatably connected. The first support plate 11 is configured to be fixedly connected with the first non-bending region 21, and the second support plate 12 is configured to be fixedly connected with the second non-bending region 22, such that the flexible display module 20 can be bent along the bending region 23 by rotating the first support plate 11 and the second support plate 12 relatively. The first support plate 11 or the second support plate 12 is provided with a transparent region 13, wherein the transparent region 13 is disposed for observation of the shifting of the flexible display module 20 at the under-screen opening 24 when the flexible display module 20 is in a bent state.

Figure 2:
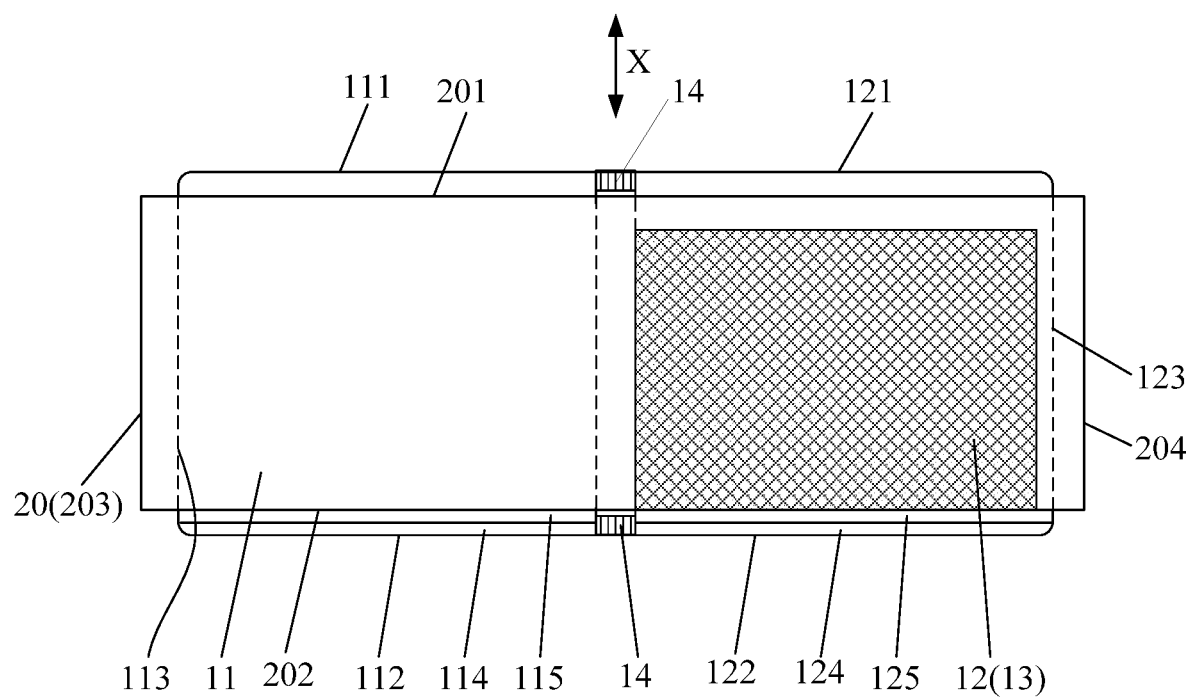
FIG. 2 is a schematic structural diagram of fixing the flexible display module on the fixture of FIG. 1 during testing the bending shifting of the flexible display module using the fixture of FIG. 1.

As shown in FIG. 2, FIG. 2 is a schematic structural diagram of fixing the flexible display module on the fixture of FIG. 1 during testing the bending shifting of the flexible display module using the fixture of FIG. 1. The fixture 10 for testing the bending shifting of the flexible display module 20 according to the embodiment of the present disclosure, upon testing the bending shifting of the flexible display module 20, can fixedly connect the first non-bending region 21 and the second non-bending region 22 of the flexible display module 20 located at the two sides of the bending region 23 to a first surface of the first support plate 11 and a second surface of the second support plate 12 of the fixture 10, respectively. Moreover, two side edges of the flexible display module 20 parallel to a length direction of the bending region 23 can respectively protrude from corresponding side edges of the first support plate 11 and the second support plate 12. In the example of FIG. 2, the length direction of the bending region 23 is X direction in the figure, and a side edge c 203 and a side edge d 204 of the flexible display module 20 protrude from a fifth side edge 113 of the first support plate 11 and a sixth side edge 123 of the second support plate 12 respectively. By rotating one of the first support plate 11 and the second support plate 12 relative to the other, the flexible display module 20 can be bent along the bending region 23. Thus, when the flexible display module 20 is in a bent state (for example, the folded state shown in FIG. 4 and FIG. 5), by using a test instrument 30, the shifting at two side edges of the flexible display module 20 parallel to the length direction of the bending region 23 can be observed, and the shifting of the flexible display module 20 at the under-screen opening 24 (shown in FIG. 5) of the first non-bending region 21 or the second non-bending region 22 is also observed through the transparent region 13 of the fixture 10, such that a value of the shifting of the flexible display module 20 at the side edges and the under-screen opening 24 when bent can be measured more accurately, intuitively with a low cost.

In some exemplary embodiments, an area of the transparent region 13 may be no less than ⅔ of a total area of the first support plate 11 or the second support plate 12. As shown in FIG. 1, by way of example, the transparent region 13 is disposed on the second support plate 12, and the area of the transparent region 13 is larger than ⅔ of the total area of the second support plate 12. A shape of the transparent region 13 may not be limited, for example, it may be rectangular, and an edge of the transparent region 13 may be close to one side edge of the second support plate 12 arranged perpendicular to the length direction of the bending region 23 (i.e. the fourth side edge 122 of the second support plate 12 in the example of FIG. 1). The first support plate 11 and the second support plate 12 may be made of a metal material, and the transparent region 13 may be made of a material such as PET (polyethylene terephthalate) having a high light-transmittance.

In some exemplary embodiments, as shown in FIG. 1, FIG. 2 and FIG. 5, the first support plate 11 includes a first surface configured to be fixedly connected with the first non-bending region 21, and the second support plate 12 includes a second surface configured to be fixedly connected with the second non-bending region 22. The first support plate 11 includes a first side edge 111 and a second side edge 112 disposed oppositely, and the first side edge 111 and the second side edge 112 are both arranged perpendicular to the length direction (X direction in FIG. 1) of the bending region 23. The second support plate 12 includes a third side edge 121 and a fourth side edge 122 disposed oppositely, and the third side edge 121 and the fourth side edge 122 are both arranged perpendicular to the length direction of the bending region 23, the first side edge 111 and the third side edge 121 are located at a same side of the fixture 10, and the second side edge 112 and the fourth side edge 122 are located at a same side of the fixture 10. The first side edge 111 is provided with a first stopper 114 protruding with respect to the first surface of the first support plate 11, the third side edge 121 is provided with a second stopper 124, wherein the second stopper 124 protrudes with respect to the second surface of the second support plate 12. When the first support plate 11 is rotated relative to the second support plate 12 until the first surface of the first support plate 11 and the second surface of the second support plate 12 are opposite and parallel to each other (i.e. the condition shown in FIG. 3 and FIG. 5), the first stopper 114 is supported on the second support plate 12, and the second stopper 124 is supported on the first support plate 11. Alternatively, the second side edge 112 is provided with a first stopper 114 protruding with respect to the first surface of the first support plate 11, the fourth side edge 122 is provided with a second stopper 124 protruding with respect to the second surface of the second support plate 12. When the first support plate 11 is rotated relative to the second support plate 12 until the first surface of the first support plate 11 and the second surface of the second support plate 12 are opposite and parallel to each other, the first stopper 114 is supported on the second support plate 12, and the second stopper 124 is supported on the first support plate 11.

In an example of this embodiment, as shown in FIG. 1 and FIG. 2, the second side edge 112 of the first support plate 11 is provided with a first stopper 114, wherein the first stopper 114 may be a baffle and is disposed along the second side edge 112 of the first support plate 11. The fourth side edge 122 of the second support plate 12 is provided with a second stopper 124, wherein the second stopper 124 may be a baffle and is disposed along the fourth side edge 122 of the second support plate 12. When the first support plate 11 is rotated relative to the second support plate 12 until the first surface of the first support plate 11 and the second surface of the second support plate 12 are opposite and parallel to each other, the first stopper 114 and the second stopper 124 can be brought into abutment. In other embodiments, the first stopper 114 and the second stopper 124 may each include multiple limiting blocks arranged at intervals. When the first support plate 11 is rotated relative to the second support plate 12 until the first surface of the first support plate 11 and the second surface of the second support plate 12 are opposite and parallel to each other, the multiple limiting blocks of the first stopper 114 may be abutted on the second surface of the second support plate 12, and the multiple limiting blocks of the second stopper 124 may be abutted on the first surface of the first support plate 11.

In this embodiment, the first stopper 114 and the second stopper 124 may function in position limiting, such that a gap between the first surface of the first support plate 11 and the second surface of the second support plate 12 is ensured when the first support plate 11 is rotated relative to the second support plate 12 until the first surface of the first support plate 11 and the second surface of the second support plate 12 are opposite and parallel to each other, so as to prevent damages to the flexible display module 20.

In some exemplary embodiments, the first stopper may be disposed along the first side edge, a side surface of the first stopper facing the flexible display module is provided with a first buffer layer, the second stopper may be disposed along the third side edge, and a side surface of the second stopper facing the flexible display module is provided with a second buffer layer. Alternatively, as shown in FIG. 1 and FIG. 2, the first stopper 114 is disposed along the second side edge 112, a side surface of the first stopper 114 facing the flexible display module 20 is provided with a first buffer layer 115. The second stopper 124 is disposed along the fourth side edge 122, and a side surface of the second stopper 124 facing the flexible display module 20 is provided with a second buffer layer 125. In this embodiment, by providing the first buffer layer 115 and the second buffer layer 125, the flexible display module 20 can be protected and the flexible display module 20 can be prevented from being damaged by contact with the first stopper 114 and the second stopper 124. A material of the first buffer layer 115 and the second buffer layer 125 may be foam or rubber, etc.

In some exemplary embodiments, as shown in FIG. 1, the first support plate 11 and the second support plate 12 may be rotatably connected with two rotary assemblies 14. A structure of the rotary assembly 14 may not be limited, for example, it may be an assembly including a hinge shaft or a gear transmission assembly, or the like. The gear transmission assembly may include two meshed gears, and the two gears are respectively connected to the first support plate 11 and the second support plate 12. The rotary assemblies 14 may be connected to one side edge of the first support plate 11 (the side edge opposite to the fifth side edge 113) and one side edge of the second support plate 12 (the side edge opposite to the sixth side edge 123) respectively. There is a gap between the side edge of the first support plate 11 connected to the rotary assembly 14 and the side edge of the second support plate 12 connected to the rotary assembly 14 and the side edges may be arranged in parallel or symmetrically, and the gap is configured to avoid the bending region during bending the flexible display module along the bending region. In some examples, as shown in FIG. 5, when the display module is bent to the folded state, the bending region 23 may extend to outside the fixture 10 from the gap.

Figure 6:
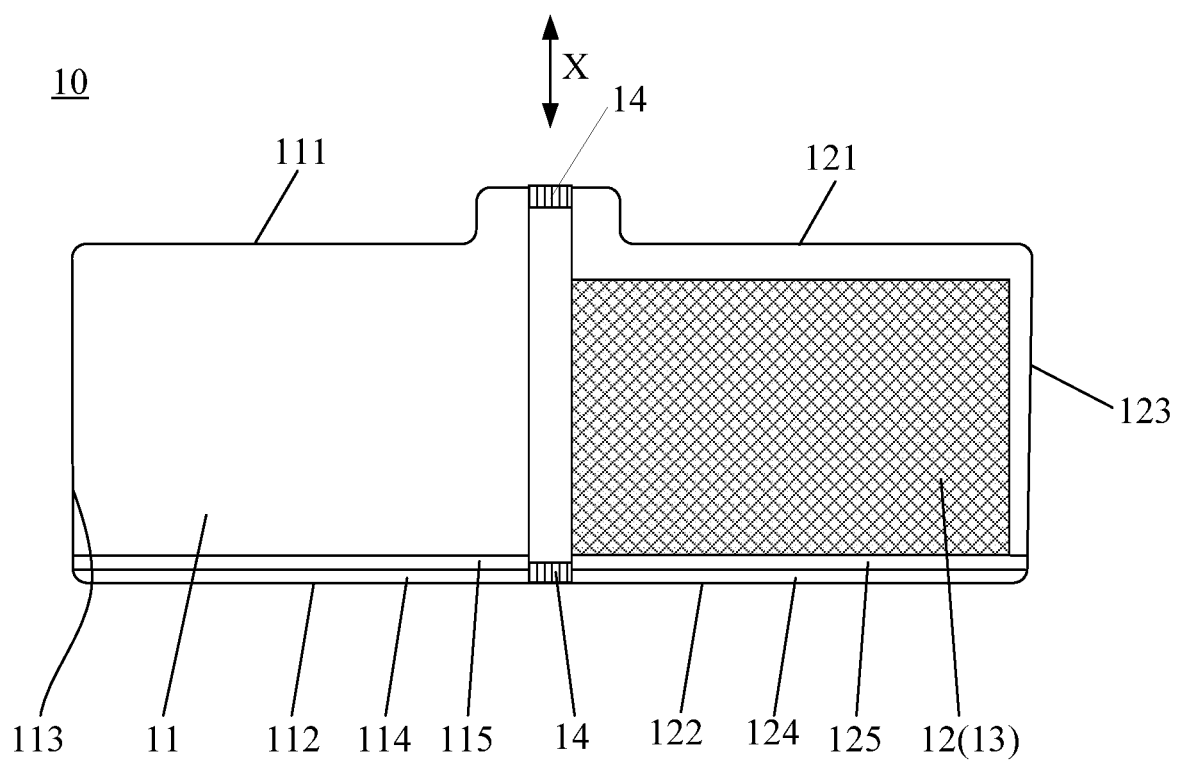
FIG. 6 is a schematic structural diagram of a fixture for testing bending shifting of a flexible display module in a deployed state according to some other exemplary embodiments.
Figure 7:
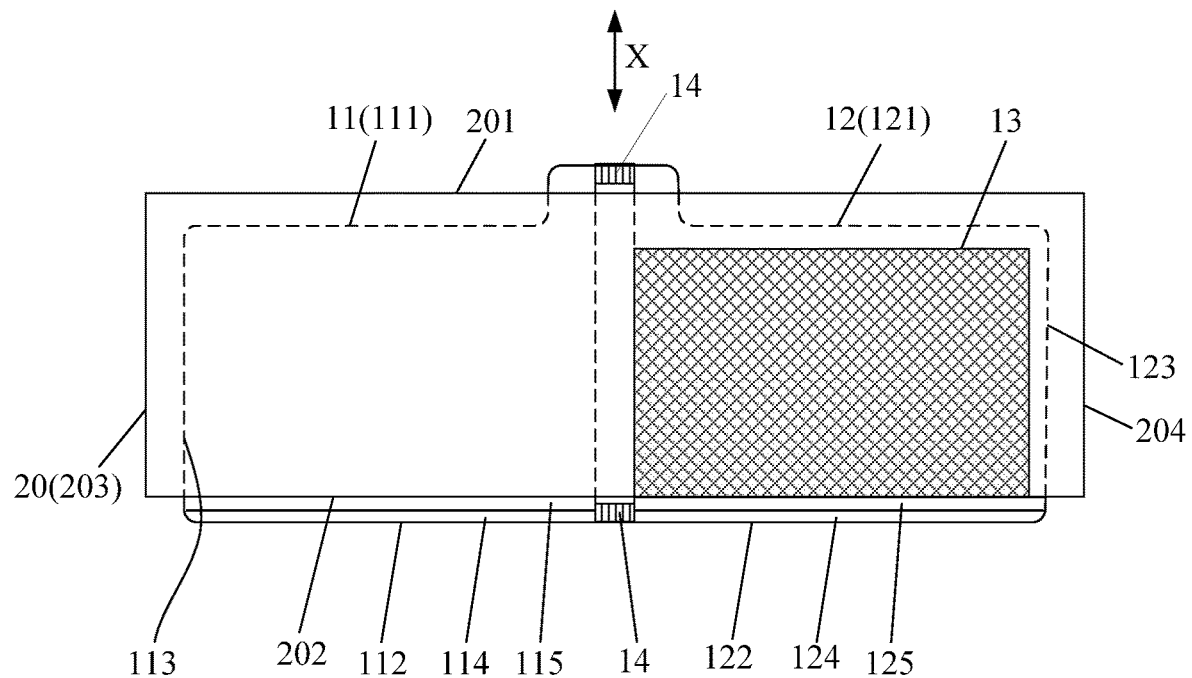
FIG. 7 is a schematic structural diagram of fixing the flexible display module on the fixture of FIG. 6 during testing the bending shifting of the flexible display module using the fixture of FIG. 6.
Figure 8:
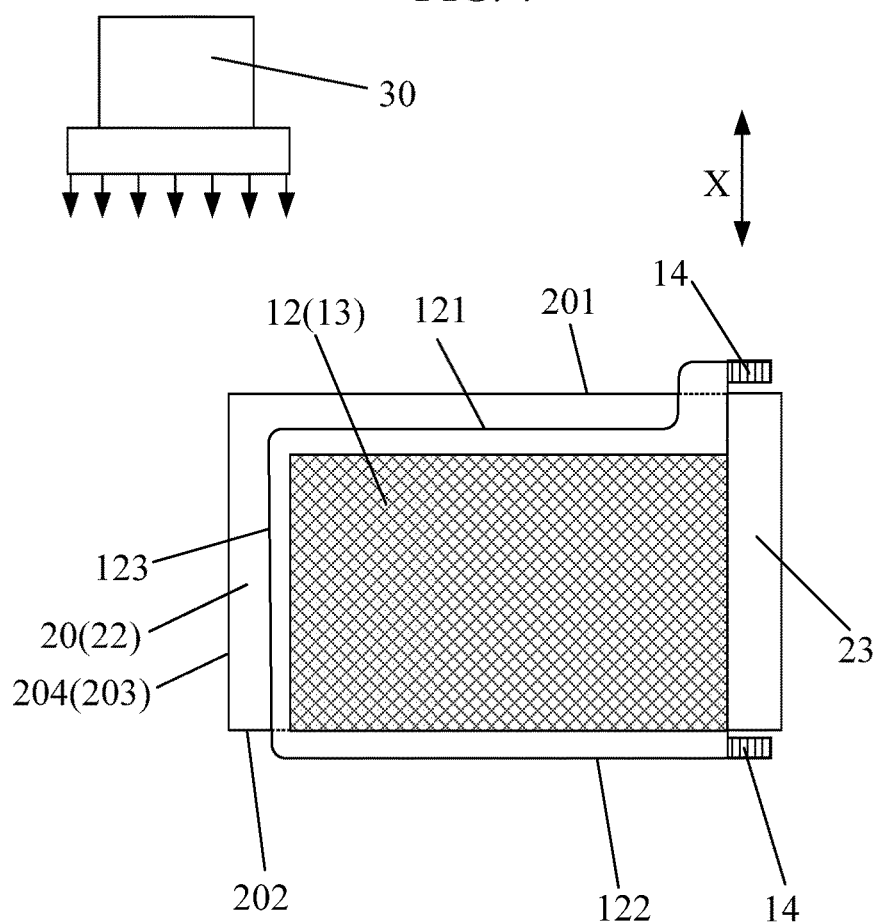
FIG. 8 is a schematic structural diagram of the flexible display module and the fixture when the flexible display module is bent to a folded state during testing the bending shifting of the flexible display module using the fixture of FIG. 6.

In some other exemplary embodiments, as shown in FIG. 6, FIG. 7 and FIG. 8, FIG. 6 is a schematic structural diagram of a fixture for testing bending shifting of a flexible display module in a deployed state according to some other exemplary embodiments. FIG. 7 is a schematic structural diagram of fixing the flexible display module on the fixture of FIG. 6. FIG. 8 is a schematic structural diagram of the flexible display module and the fixture when the flexible display module is bent to a folded state during testing the bending shifting of the flexible display module using the fixture of FIG. 6. In this example, the first side edge 111 of the first support plate 11 and the third side edge 121 of the second support plate 12 may each have one protrusion, wherein one of the rotary assemblies 14 is connected to the protrusion of the first side edge 111 and the protrusion of the third side edge 121. In this way, as shown in FIG. 7, a distance between the two rotary assemblies 14 of the fixture may be configured to be greater than a length of short side edges (side edge c 203 and side edge d 204 in FIG. 7) of the flexible display module 20. Thus, one long side edge (side edge a 201 in FIG. 7) of the flexible display module 20 may protrude from the first side edge 111 of the first support plate 11 and the third side edge 121 of the second support plate 12, so that the shifting at the two short side edges and one long side edge of the flexible display module can be observed by a test instrument.

An embodiment of the present disclosure further provides a method for testing the bending shifting of the flexible display module using a fixture. The flexible display module includes a bending region, a first non-bending region and a second non-bending region located at two sides of the bending region, wherein the flexible display module is bent through the bending region, a length direction of the bending region is taken as a first direction, and the fixture includes a first support plate and a second support plate rotatably connected, and the method includes following steps:

fixedly connecting the first non-bending region and the second non-bending region of the flexible display module to a first surface of the first support plate and a second surface of the second support plate, and making two side edges of the flexible display module parallel to the first direction protrude from corresponding side edges of the first support plate and the second support plate, respectively;

rotating one of the first support plate and the second support plate by an preset angle relative to the other, so that the flexible display module can be bent along the bending region;

observing shifting at two side edges of the flexible display module parallel to the first direction using a test instrument when the flexible display module is in a bent state.

In the method for testing bending shifting of a flexible display module according to the embodiment of the present disclosure, when the flexible display module is fixedly connected with the fixture, the first non-bending region and the second non-bending region of the flexible display module located at the two sides of the bending region are fixedly connected to the first surface of the first support plate and the second surface of the second support plate of the fixture, and the two side edges of the flexible display module parallel to the length direction of the bending region respectively protrude from corresponding side edges of the first support plate and the second support plate. By rotating one of the first support plate and the second support plate relative to the other, the flexible display module is bent along the bending region. In this way, when the flexible display module is in the bent state, the shifting at the two side edges of the flexible display module parallel to the length direction of the bending region is observed using a test instrument, so that the shifting values at the side edges of the flexible display module during bending can be measured accurately, intuitively with a low cost, and the test method is simple.

In some exemplary embodiments, the test instrument may include a microscope which can observe a shifting value.

In some exemplary embodiments, the first non-bending region or the second non-bending region may be provided with an under-screen opening, and the first support plate or the second support plate may be provided with a transparent region. The method may further include the following step: when the flexible display module is in the bent state, observing the shifting at the under-screen opening through the transparent region using a test instrument. In this way, the fixture is provided with the transparent region, and the shifting at the under-screen opening can be observed using the test instrument through the transparent region, thus providing an accurate and intuitive measurement and a simple test method.

In some exemplary embodiments, the under-screen opening of the flexible display module may be an opening for accommodating an under-screen camera module or other light sensor module. The flexible display module may include a flexible display substrate, a touch control structure layer, a polarizer and a cover plate which are sequentially stacked on a display side of the flexible display substrate, and functional film layers such as a support layer and a heat dissipation layer which are stacked on a side of the flexible display substrate facing away from the display side. The under-screen opening may penetrate through other film layers of the flexible display module except the cover plate, and testing the shifting at the under-screen opening may be testing the shifting between the polarizer and the cover plate at the under-screen opening.

In some exemplary embodiments, as shown in FIG. 2 and FIG. 4, two side edges of the flexible display module 20 parallel to the first direction (X direction in FIG. 2 and FIG. 4) are a side edge c 203 and a side edge d 204 of the flexible display module 20, wherein the side edge c 203 and the side edge d 204 may be overlapped when the flexible display module 20 is in the folded state of FIG. 4. The side edge c 203 and the side edge d 204 of the flexible display module 20 protrude from a fifth side edge 113 of the first support plate 11 and the sixth side edge 123 of the second support plate 12, respectively. A length of side edges (a side edge a 201 and a side edge b 202 of the flexible display module 20 in FIG. 2) perpendicular to the first direction of the flexible display module 20 is 2L, a width of the portion of the flexible display module 20 protruding from the fifth side edge 113 of the first support plate 11 or the sixth side edge 123 of the second support plate 12 in a direction perpendicular to the first direction may be 5% of L to 20% of L. In this example, the side edge c 203 and the side edge d 204 of the flexible display module 20 protrude from the fifth side edge 113 of the first support plate 11 and the sixth side edge 123 of the second support plate 12, respectively, and the width of the protruding portion is 5% of L to 20% of L, which facilitates the test instrument 30 to intuitively observe the shifting at the side edge c 203 and the side edge d 204 of the flexible display module 20. If a portion of the flexible display module 20 close to the side edge c 203 or the side edge d 204 is provided with an opening, the opening may be located at the portion of the flexible display module 20 protruding from the fifth side edge 113 of the first support plate 11 or the sixth side edge 123 of the second support plate 12, and the shifting at the opening can be intuitively observed by the test instrument 30. In other embodiments, one of the side edge c 203 and the side edge d 204 of the flexible display module 20 may protrude from a corresponding side edge of the fixture and shifting at the protruding side edge of the flexible display module 20 may be observed using the test instrument 30.

In some exemplary embodiments, as shown in FIG. 5, the second non-bending region 22 may be provided with an under-screen opening 24, the second support plate 12 may be provided with a transparent region 13, and the method may further include the following step: when the flexible display module is in the bent state, observing the shifting at the under-screen opening 24 through the transparent region 13 using a test instrument. In this way, the fixture is provided with the transparent region, and the shifting at the under-screen opening can be observed using the test instrument through the transparent region, thus providing an accurate and intuitive measurement and a simple test method.

In some exemplary embodiments, the step of fixedly connecting the first non-bending region and the second non-bending region of the flexible display module to the first surface of the first support plate and the second surface of the second support plate, and making the two side edges of the flexible display module parallel to the first direction protrude from the corresponding side edges of the first support plate and the second support plate respectively, may include: fixedly connecting the first non-bending region and the second non-bending region of the flexible display module (for example, adhesive or double-sided adhesive tape may be used for bonding and fixing) to the first surface of the first support plate and the second surface of the second support plate, respectively, and making the two side edges of the flexible display module parallel to the first direction protrude from the corresponding side edges of the first support plate and the second support plate respectively, and making one side edge of the flexible display module perpendicular to the first direction protrude from corresponding side edges of the first support plate and the second support plate.

In an example of this embodiment, as shown in FIG. 6, FIG. 7 and FIG. 8, the first direction is the X direction in FIG. 6 to FIG. 8, the first non-bending region and the second non-bending region of the flexible display module 20 are fixedly connected to the first surface of the first support plate 11 and the second surface of the second support plate 12, respectively, the side edge c 203 and the side edge d 204 of the flexible display module 20 parallel to the first direction protrude from the fifth side edge 113 of the first support plate 11 and the sixth side edge 123 of the second support plate 12, respectively, and the side edge a 201 of the flexible display module 20 perpendicular to the first direction protrudes from the first side edge 111 of the first support plate 11 and the third side edge 121 of the second support plate 12. In this example, the side edge a 201 of the flexible display module 20 protrudes from the first side edge 111 of the first support plate 11 and the third side edge 121 of the second support plate 12, so that the shifting at the side edge a 201 of the flexible display module 20 can be intuitively observed using a test instrument.

In some exemplary embodiments, one side edge of the flexible display module perpendicular to the first direction protrudes from the first side edge of the first support plate and the third side of the second support plate, wherein a length of a side edge of the flexible display module parallel to the first direction is W, and a width of the portion of the flexible display module protruding from the first side edge of the first support plate or the third side edge of the second support plate in the direction parallel to the first direction is 5% of W to 20% of W.

In an example of this embodiment, as shown in FIG. 6 to FIG. 8, the side edge a 201 of the flexible display module 20 perpendicular to the first direction protrudes from the first side edge 111 of the first support plate 11 and the third side edge 121 of the second support plate 12. A length of the side edge c 203 and the side edge d 204 parallel to the first direction of the flexible display module 20 is W, a portion of the flexible display module 20 protruding from the first side edge 111 of the first support plate 11 or the third side edge 121 of the second support plate 12 has a width of 5% of W to 20% of W in the direction parallel to the first direction. In this way, the shifting at the side edge a 201 of the flexible display module 20 can be intuitively observed by the test instrument in a convenient manner. If a portion of the flexible display module 20 close to the side edge a 201 is provided with an opening, the opening may be located at the portion of the flexible display module 20 protruding from the first side edge 111 of the first support plate 11 or the third side edge 121 of the second support plate 12, and the shifting at the opening can be intuitively observed by the test instrument 30.

In some exemplary embodiments, the step of rotating one of the first support plate and the second support plate relative to the other by a preset angle such that the flexible display module is bent along the bending region, includes: rotating one of the first support plate 11 and the second support plate 12 relative to the other until the first surface of the first support plate 11 is opposite and parallel to the second surface of the second support plate 12, so that the flexible display module 20 is bent along the bending region 23 until the flexible display module 20 is in a folded state, which is shown in FIG. 4 and FIG. 5 in some examples. Thus, when the flexible display module 20 is bent to the folded state, the flexible display module 20 is bent to a maximum level, and the shifting of the flexible display module 20 at the maximum bending level can be tested. During the test, one of the first support plate 11 and the second support plate 12 may be rotated relative to the other to multiple positions at different angles, such that the shifting of the flexible display module 20 at different bending level can be tested.

In some exemplary embodiments, as shown in FIG. 6 and FIG. 7, one side edge of the flexible display module 20 perpendicular to the first direction (the side edge a 201 of the flexible display module 20 in FIG. 7) protrudes from the first side edge 111 of the first support plate 11 and the third side edge 121 of the second support plate 12. The first support plate 11 includes a second side edge 112 opposite to the first side edge 111, and the second side edge 112 of the first support plate 11 is provided with a first stopper 114, wherein the first stopper 114 protrudes with respect to the first surface of the first support plate 11. The second support plate 12 includes a fourth side edge 122 opposite to the third side edge 121, and the fourth side edge 122 of the second support plate 12 is provided with a second stopper 124, wherein the second stopper 124 protrudes with respect to the second surface of the second support plate 12. When one of the first support plate 11 and the second support plate 12 is rotated relative to the other until the first surface of the first support plate 11 and the second surface of the second support plate 12 are opposite and parallel to each other (the condition shown in FIG. 8), the first stopper 114 is supported on the second support plate 12 and the second stopper 124 is supported on the first support plate 11.

In an example of this embodiment, as shown in FIG. 6, for example, the first stopper 114 may be a baffle and disposed along the second side edge 112 of the first support plate 11. The second stopper 124 may be a baffle and is disposed along the fourth side edge 122 of the second support plate 12. When the first support plate 11 is rotated relative to the second support plate 12 until the first surface of the first support plate 11 and the second surface of the second support plate 12 are opposite and parallel to each other, the first stopper 114 and the second stopper 124 can be brought into abutment. In other embodiments, the first stopper 114 and the second stopper 124 may each include multiple limiting blocks arranged at intervals. When the first support plate 11 is rotated relative to the second support plate 12 until the first surface of the first support plate 11 and the second surface of the second support plate 12 are opposite and parallel to each other, the multiple limiting blocks of the first stopper 114 may be abutted on the second surface of the second support plate 12, and the multiple limiting blocks of the second stopper 124 may be abutted on the first surface of the first support plate 11.

In this embodiment, the first stopper 114 and the second stopper 124 may function in position limiting, such that a gap between the first surface of the first support plate 11 and the second surface of the second support plate 12 is ensured when the first support plate 11 is rotated relative to the second support plate 12 until the first surface of the first support plate 11 and the second surface of the second support plate 12 are opposite and parallel to each other, so as to prevent damages to the flexible display module 20.

In some exemplary embodiments, as shown in FIG. 6 and FIG. 7, the first stopper 114 is disposed along the second side edge 112 of the first support plate 11, and a side surface of the first stopper 114 facing the flexible display module 20 is provided with a first buffer layer 115. The second stopper 124 is disposed along the fourth side edge 122 of the second support plate 12, and a side surface of the second stopper 124 facing the flexible display module 20 is provided with a second buffer layer 125.

The step of fixedly connecting the first non-bending region and the second non-bending region of the flexible display module to the first surface of the first support plate and the second surface of the second support plate respectively such that the two side edges of the flexible display module parallel to the first direction protrude from the corresponding side edges of the first support plate and the second support plate respectively, and one side edge of the flexible display module perpendicular to the first direction protrudes from the corresponding side edges of the first support plate and the second support plate, includes:

fixedly connecting the first non-bending region and the second non-bending region of the flexible display module to the first surface of the first support plate and the second surface of the second support plate respectively, making two side edges parallel to the first direction of the flexible display module protrude from the corresponding side edges of the first support plate and the second support plate respectively, making one side edge of the flexible display module perpendicular to the first direction protrude from the corresponding side edges of the first support plate and the second support plate, and making the other side edge of the flexible display module perpendicular to the first direction face the first buffer layer and the second buffer layer.

In an example of this embodiment, as shown in FIG. 6 and FIG. 7, the first direction is the X direction in FIG. 6 to FIG. 7, the first non-bending region and the second non-bending region of the flexible display module 20 are fixedly connected to the first surface of the first support plate 11 and the second surface of the second support plate 12, respectively, such that the side edge c 203 and the side edge d 204 of the flexible display module 20 parallel to the first direction protrude from the fifth side edge 113 of the first support plate 11 and the sixth side edge 123 of the second support plate 12, respectively, and the side edge a 201 of the flexible display module 20 perpendicular to the first direction protrudes from the first side edge 111 of the first support plate 11 and the third side edge 121 of the second support plate 12, and the side edge b 202 of the flexible display module faces the first buffer layer 115 and the second buffer layer 125. In this example, when the flexible display module 20 is in a bent state (such as the folded state shown in FIG. 8), shifting at the side edge a 201, side edge c 203, and side edge d 204 of the flexible display module 20 can be intuitively observed by a test instrument, and the side edge b 202 of the flexible display module 20 can be protected from being damaged by contact with the first stopper 114 and the second stopper 124.

In the accompanying drawings, a size of a constituent element, and a thickness of a layer or a region are sometimes exaggerated for clarity. Therefore, one implementation of the present disclosure is not necessarily limited to the size, and the shape and size of each component in the drawings do not reflect an actual scale. In addition, the drawings schematically illustrate some examples, and one implementation of the present disclosure is not limited to the shapes or numerical values shown in the drawings.

In the description herein, "parallel" refers to a state in which an angle formed by two straight lines is above −10° and below 10°, and thus also includes a state in which the angle is above −5° and below 5°. In addition, "vertical" refers to a state in which an angle formed by two straight lines is above 80° and below 100°, and thus also includes a state in which the angle is above 85° and below 95°.

In the description herein, orientation or position relationships indicated by the terms such as "upper", "lower", "left", "right", "top", "inside", "outside", "axial", "tetragonal" and the like are orientation or position relationships shown in the drawings, and are intended to facilitate description of the embodiments of the present disclosure and simplification of the description, but not to indicate or imply that the mentioned structure has a specific orientation or be constructed and operated in a specific orientation, therefore, they should not be understood as limitations on the present disclosure.

In the description herein, unless otherwise specified and defined explicitly, the terms "connection", "fixed connection", "installation" and "assembly" should be understood in a broad sense, and, for example, may be a fixed connection, a detachable connection or an integrated connection; the terms "installation", "connection" and "fixed connection" may be a direct connection, an indirect connection through intermediate components, or communication inside two components. For those ordinarily skilled in the art, meanings of the above terms in the embodiments of the present disclosure may be understood according to situations.

The invention claimed is:

1. A system for testing bending shifting of a flexible display module, comprising a fixture and the flexible display module, wherein the flexible display module comprises a bending region, a first non-bending region and a second non-bending region located at two sides of the bending region, the flexible display module is bent through the bending region, and the first non-bending region or the second non-bending region is provided with an under-screen opening;

the fixture comprises a first support plate and a second support plate which are rotatably connected, wherein the first support plate is configured to be fixedly connected with the first non-bending region, and the second support plate is configured to be fixedly connected with the second non-bending region; and the first support plate or the second support plate is provided with a transparent region, and the transparent region is disposed for observation of shifting at the under-screen opening of the flexible display module in a bent state;

wherein the first support plate and the second support plate are rotatably connected with two rotary assemblies respectively;

a gap is formed between a side edge of the first support plate connected to one rotary assembly and a side edge of the second support plate connected to the other rotary assembly and the side edges are arranged in parallel or symmetrically, wherein the gap is configured to avoid the bending region during bending the flexible display module along the bending region, and when the flexible display module is bent to a folded state, the bending region extends outside the fixture from the gap;

wherein a length direction of the bending region is taken as a first direction;

wherein two side edges of the flexible display module parallel to the first direction protrude from a fifth side edge of the first support plate and a sixth side edge of the second support plate, respectively; a length of a side edge of the flexible display module perpendicular to the first direction is 2L, and a portion of the flexible display module protruding from the fifth side edge of the first support plate or the sixth side edge of the second support plate has a width of 5% of L to 20% of L in a direction perpendicular to the first direction; and wherein one side edge of the flexible display module perpendicular to the first direction protrudes from a first side edge of the first support plate and a third side edge of the second support plate; a length of one of the two side edges of the flexible display module parallel to the first direction is W, and a width of a portion of the flexible display module protruding from the first side edge of the first support plate or the third side edge of the second support plate in a direction parallel to the first direction is 5% of W to 20% of W.

2. The system for testing the bending shifting of the flexible display module according to claim 1, wherein an area of the transparent region is no less than ⅔ of an total area of the first support plate or the second support plate.

3. The system for testing the bending shifting of the flexible display module according to claim 1, wherein the first support plate comprises a first surface configured to be fixedly connected with the first non-bending region, and the second support plate comprises a second surface configured to be fixedly connected with the second non-bending region.

4. The system for testing the bending shifting of the flexible display module according to claim 3, wherein the first support plate comprises the first side edge and a second side edge oppositely arranged, the first side edge and the second side edge are both arranged perpendicular to the first direction, and the second support plate comprises the third side edge and a fourth side edge oppositely arranged, the third side edge and the fourth side edge are both arranged perpendicular to the first direction, the first side edge and the third side edge are located at a same side of the fixture, and the second side edge and the fourth side edge are located at a same side of the fixture.

5. The system for testing the bending shifting of the flexible display module according to claim 4, wherein the first side edge is provided with a first stopper, the first stopper protrudes with respect to the first surface of the first support plate, the third side edge is provided with a second stopper, the second stopper protrudes with respect to the second surface of the second support plate, when the first support plate is rotated relative to the second support plate until the first surface of the first support plate is opposite to and parallel to the second surface of the second support plate, the first stopper is supported on the second support plate, and the second stopper is supported on the first support plate; or, the second side edge is provided with a first stopper, the first stopper protrudes with respect to the first surface of the first support plate, the fourth side edge is provided with a second stopper, the second stopper protrudes with respect to the second surface of the second support plate, when the first support plate is rotated relative to the second support plate until the first surface of the first support plate is opposite and parallel to the second surface of the second support plate, the first stopper is supported on the second support plate, and the second stopper is supported on the first support plate.

6. The system for testing the bending shifting of the flexible display module according to claim 5, wherein the first stopper is disposed along the first side edge, a side surface of the first stopper facing the flexible display module is provided with a first buffer layer, the second stopper is disposed along the third side edge, and a side surface of the second stopper facing the flexible display module is provided with a second buffer layer.

7. The system for testing the bending shifting of the flexible display module according to claim 5, wherein the first stopper is disposed along the second side edge, a side surface of the first stopper facing the flexible display module is provided with a first buffer layer, the second stopper is disposed along the fourth side edge, and a side surface of the second stopper towards the flexible display module is provided with a second buffer layer.

8. The system for testing the bending shifting of the flexible display module according to claim 5, wherein the first support plate and the second support plate are made of a metal material, and the transparent region is made of polyethylene terephthalate (PET).

9. The system for testing the bending shifting of the flexible display module according to claim 5, wherein the first stopper and the second stopper each comprise a plurality of limiting blocks arranged at intervals; and
when the first support plate is rotated relative to the second support plate until the first surface of the first support plate and the second surface of the second support plate are opposite and parallel to each other, the plurality of limiting blocks of the first stopper is abutted on the second surface of the second support plate, and the plurality of limiting blocks of the second stopper is abutted on the first surface of the first support plate.

10. A method for testing bending shifting of a flexible display module using a fixture, wherein the flexible display module comprises a bending region, a first non-bending region and a second non-bending region located at two sides of the bending region, the flexible display module is bent through the bending region, a length direction of the bending region is taken as a first direction, and the fixture comprises a first support plate and a second support plate which are rotatably connected, and the method comprises:
fixedly connecting the first non-bending region the flexible display module to a first surface of the first support plate, fixedly connecting the second non-bending region of the flexible display module to a second surface of the second support plate, and making two side edges of the flexible display module parallel to the first direction protrude from corresponding side edges of the first support plate and the second support plate respectively;
rotating one of the first support plate and the second support plate relative to the other one of the first support plate and the second support plate by an preset angle, such that the flexible display module is capable of being bent along the bending region; and
observing shifting at two side edges of the flexible display module parallel to the first direction using a test instrument when the flexible display module is in a bent state;
wherein the first non-bending region or the second non-bending region is provided with an under-screen opening, the first support plate or the second support plate is provided with a transparent region, and the method further comprises:
observing shifting at the under-screen opening through the transparent region using the test instrument when the flexible display module is in the bent state;
wherein the first support plate and the second support plate are rotatably connected with two rotary assemblies respectively;
a gap is formed between a side edge of the first support plate connected to one rotary assembly and a side edge of the second support plate connected to the other rotary assembly and the side edges are arranged in parallel or symmetrically, wherein the gap is configured to avoid the bending region during bending the flexible display module along the bending region, when the flexible display module is bent to a folded state, the bending region extends outside the fixture from the gap;
wherein two side edges of the flexible display module parallel to the first direction protrude from a fifth side edge of the first support plate and a sixth side edge of the second support plate, respectively; a first direction is a length direction of the bending region; a length of a side edge of the flexible display module perpendicular to the first direction is 2L, and a portion of the flexible display module protruding from the fifth side edge of the first support plate or the sixth side edge of the second support plate has a width of 5% of L to 20% of L in a direction perpendicular to the first direction; and wherein one side edge of the flexible display module perpendicular to the first direction protrudes from a first side edge of the first support plate and a third side edge of the second support plate; a length of one of the two side edges of the flexible display module parallel to the first direction is W, and a width of a portion of the flexible display module protruding from the first side edge of the first support plate or the third side edge of the second support plate in a direction parallel to the first direction is 5% of W to 20% of W.

11. The method according to claim 10, wherein fixedly connecting the first non-bending region of the flexible display module to the first surface of the first support plate, fixedly connecting the second non-bending region of the flexible display module to the second surface of the second support plate, and making the two side edges of the flexible display module parallel to the first direction protrude from the corresponding side edges of the first support plate and the second support plate respectively comprises:

fixedly connecting the first non-bending region of the flexible display module to the first surface of the first support plate, fixedly connecting the second non-bending region of the flexible display module to the second surface of the second support plate, and making the two side edges of the flexible display module parallel to the first direction protrude from the corresponding side edges of the first support plate and the second support plate respectively, and making one side edge of the flexible display module perpendicular to the first direction protrude from corresponding side edges of the first support plate and the second support plate.

12. The method according to claim 11, wherein rotating one of the first support plate and the second support plate relative to the other one of the first support plate and the second support plate by the preset angle, such that the flexible display module is bent along the bending region comprises:

rotating one of the first support plate and the second support plate relative to the other one of the first support plate and the second support plate until the first surface of the first support plate and the second surface of the second support plate are opposite and parallel to each other, such that the flexible display module is bent along the bending region until the flexible display module is in a folded state.

13. The method according to claim 12, wherein the first support plate comprises a second side edge opposite to the first side edge, the second side edge of the first support plate is provided with a first stopper, and the first stopper protrudes with respect to the first surface of the first support plate; the second support plate comprises a fourth side edge opposite to the third side edge, the fourth side edge of the second support plate is provided with a second stopper, and the second stopper protrudes with respect to the second surface of the second support plate;

when one of the first support plate and the second support plate is rotated relative to the other one of the first support plate and the second support plate until the first surface of the first support plate and the second surface of the second support plate are opposite and parallel to each other, the first stopper is supported on the second support plate, and the second stopper is supported on the first support plate.

14. The method according to claim 13, wherein the first stopper is disposed along the second side edge of the first support plate, a side surface of the first stopper facing the flexible display module is provided with a first buffer layer; the second stopper is disposed along the fourth side edge, and a side surface of the second stopper facing the flexible display module is provided with a second buffer layer;

fixedly connecting the first non-bending region of the flexible display module to the first surface of the first support plate, fixedly connecting the second non-bending region of the flexible display module to the second surface of the second support plate, such that the two side edges of the flexible display module parallel to the first direction protrude from the corresponding side edges of the first support plate and the second support plate respectively, and the one side edge of the flexible display module perpendicular to the first direction protrudes from the corresponding side edges of the first support plate and the second support plate comprises:

fixedly connecting the first non-bending region of the flexible display module to the first surface of the first support plate, fixedly connecting the second non-bending region of the flexible display module to the second surface of the second support plate, making two side edges parallel to the first direction of the flexible display module protrude from the corresponding side edges of the first support plate and the second support plate respectively, making one side edge of the flexible display module perpendicular to the first direction protrudes from the corresponding side edges of the first support plate and the second support plate, and making another side edge of the flexible display module perpendicular to the first direction face the first buffer layer and the second buffer layer.

15. The system for testing the bending shifting of the flexible display module according to claim 1, wherein each of the rotary assemblies is a gear transmission assembly which comprises two meshed gears, and the two gears are respectively connected to the first support plate and the second support plate.

* * * * *